Nov. 1, 1955 W. H. T. HELMIG ET AL 2,722,378

MEANS FOR DETERMINING CHECK SYMBOLS FOR SYMBOL GROUPS

Filed March 6, 1951 4 Sheets-Sheet 1

Inventors: Theodorus Reumerman & Willem H.Th. Helmig
By Robert E. Burns ATTORNEY Inventors: Theodorus Reumerman & Willem H. Th. Helmig
By Robert E. Burns ATTORNEY Inventors
Theodorus Reumerman & Willem H.Th.Helmig
By Robert E. Burns ATTORNEY Nov. 1, 1955 W. H. T. HELMIG ET AL 2,722,378

MEANS FOR DETERMINING CHECK SYMBOLS FOR SYMBOL GROUPS

Filed March 6, 1951 4 Sheets-Sheet 4

Inventors
Theodorus Reumerman
Willem H. Th. Helmig
By Robert E. Burns
ATTORNEY

United States Patent Office 2,722,378

Patented Nov. 1, 1955

2,722,378

MEANS FOR DETERMINING CHECK SYMBOLS FOR SYMBOL GROUPS

Willem H. T. Helmig, Leiden, and Theodorus Reumerman, Zandvoort, Netherlands

Application March 6, 1951, Serial No. 214,177

Claims priority, application Netherlands March 10, 1950

12 Claims. (Cl. 235—86)

The invention relates to a device for facilitating the detection of errors in arbitrary symbol groups composed out of a given series of $n$ symbols. In this connection, the term "symbols" designates symbols of any kind which may be used for indicating or recording a concept, such as, for instance, letters, figures, punctuation marks, and the like.

In order to express certain concepts by means of symbols, the same are combined into symbol groups. The term "symbol groups" designates, for instance: words, numbers, sequences of a plurality of words or numbers, and sentences consisting of words, punctuation marks and numbers.

In general, the number of symbols from which a selection may be made in composing a symbol group is determined by an agreement, or by the nature of the apparatus used for recording or transmitting the symbol groups. For instance, in the transmission of code messages by means of a letter code, there exists an agreement to the effect that no other symbols shall be used than the 26 letters of the alphabet. Hence, the code message consists of symbol groups which are each composed out of a given series of 26 symbols ($n=26$).

In various devices for indicating, recording and transmitting numbers, such as, for instance, calculators, measuring instruments, counters, numerators, apparatus for automatic telephony, and the like, groups are composed out of a given series of 10 symbols ($n=10$).

In practice, frequent errors appear to occur in symbol groups of all kinds. These errors are partly brought about by a faulty operation of devices by means of which the symbol groups are recorded or transmitted, and partly by mistakes of persons working the said devices, or copying the symbol groups. The most frequently occurring error consists therein that a wrong symbol appears in one position of a symbol group; this error will be designated hereinafter by the term "one symbol error." Another error which occurs frequently, mainly due to human mistakes, consists therein that two adjacent symbols of a group have changed places with each other; this error will be designated hereinafter by the term "transposition error."

In general, the detection of errors in symbol groups involves a laborious checking process; in many cases, the errors which have been made are only brought to light by accident, or they are not detected at all.

However, the detection of errors in symbol groups may be considerably facilitated by making use of a device comprising means for determining a check symbol for each symbol group, said check symbol giving a univocal indication of the remainder $R_N(G)$ obtained on dividing a number G by a whole number N, the symbols of the given series being numbered in a predetermined manner, the said number G being equal to the algebraic sum of the numbers of the symbols of the group, each multiplied by a whole factor $k_i$, the said factors $k_i$ being dependent on the position of the symbol in the group and different for adjacent positions, and the said number N being greater than or equal to $n$ and having no divisors in common with the factors $k_i$ and with the differences between the factors $k_i$ for adjacent positions.

As appears from the above, a numbering of the symbols of the given series must precede the construction of such a device. In the device, this numbering finds expression in the order in which the symbols are placed, or in which means for handling the symbols are arranged. In general, if the given symbol series consists of the figures from 0 to 9, it will be preferable for practical reasons to number the symbols according to the numerical value of the figures, so that the numbers from 0 to 9 are ascribed to the figures from 0 to 9. If the given symbol series consists of the letters of the alphabet, it is advisable to number these letters in their usual order, for instance: $A=0$, $B=1$, $C=2$, etc.

By means of the said device, a check symbol may be determined for a given symbol group, which indicates the remainder $R_N(G)$ obtained on dividing a number G, designated hereinafter by the term "check number," by a given whole number N. As this remainder may assume N different values, N symbols are required to indicate the remainder in a univocal manner; hence, the check symbols are to be selected from a series of N symbols.

The above-mentioned check number G is equal to the algebraic sum of the numbers of the symbols of the group, each multiplied by a whole factor $k_i$ dependent on the position of the symbol in the group. Hereinafter, the position of a symbol in a group will always be determined by counting the positions from right to left. If the symbol appearing in position $i$ of the group is called $A_i$, and the number of this symbol $a_i$, and if the multiplication factor $k_i$ prevails for position $i$, the check number G of the group $$\overline{A_q A_{q-1} \ldots A_3 A_2 A_1}$$

is equal to $\Sigma k_i a_i$.

The factors $k_i$ and the number N are chosen in such manner that a one symbol error, as well as a transposition of two adjacent symbols of the group, will always lead to an alteration of the check symbol pertaining to the group, so that the said errors may be detected at any time by determining the check symbol again, and by comparing the same with the check symbol which has been initially determined. The conditions to be satisfied to this end by the number N and the factors $k_i$ will now be explained.

In the case of a one symbol error, the symbol $A_i$ initially appearing in position $i$ of the symbol group has been replaced by another symbol $A_x$ which may be assumed to have the number $a_x$. Hence, the check number G of the group has been increased by an amount $k_i(a_x-a_i)$, and the check symbol of the group will have been altered by the error if $R_N[k_i(a_x-a_i)]\neq 0$. First of all, the numbers $k_i$ and $(a_x-a_i)$ must be indivisible by N to this end. The absolute value of the difference $(a_x-a_i)$ may vary from 1 to $(n-1)$; hence, if N is selected to be greater than or equal to $n$, is is certain that $(a_x-a_i)$ will be indivisible by N. If, furthermore, all the factors $k_i$ are chosen in such manner as to be indivisible by N, the above-mentioned condition is satisfied. However, there is still a possibility that N is equal to the product of two numbers $p$ and $q$, $k_i$ being divisible by $p$ and $(a_x-a_i)$ being divisible by $q$. In this case, the product $k_i(a_x-a_i)$ would be divisible by N, so that $R_N(G)$ would not have been altered by the error. In order to exclude this possibility, care has to be taken that N has no divisors in common with the factors $k_i$. If the concept "divisor of a number" is defined in such manner as to include the number itself (so that, for instance, the divisors of the number 45 would be the number 3, 5, 9, 15 and 45), this condition includes the above-mentioned condition that the factors $k_i$ must be indivisible by N. Hereinafter, the term "divisor" will always be used in this sense.

In the case of a transposition error, the symbol $A_i$ and $A_j$ initially appearing in positions $i$ and $j$ of the group, have changed places with each other. Hence, the check number of the group has been increased by an amount $k_i(a_j-a_i)+k_j(a_i-a_j)=(k_i-k_j).(a_j-a_i)$, and the check symbol of the group will have been altered by the error if $R_N[(k_i-k_j)(a_j-a_i)]\neq 0$. To this end, the factors $k_i$ and $k_j$ must be different, and furthermore, it may be inferred by means of the train of thought followed hereinbefore that N may not have any divisors in common with the difference $(k_i-k_j)$. Hence, if a transposition of two adjacent symbols is required to lead to an alteration of the check symbol in all cases, the factors $k_i$ for adjacent positions must be different, and N may not have any divisors in common with the differences between factors $k_i$ for adjacent positions. If it is desired that each transposition of two arbitrary symbols of the group shall lead to an alteration of the check symbol, the more stringent requirement must be made that all factors $k_i$ are different and that N has no divisors in common with any difference between two factors $k_i$. In general, however, this latter requirement is not necessary, since transpositions of adjacent symbols are by far the most frequent.

As appears from the above explanation, the device will have to satisfy the conditions that the factors $k_i$ are different at least for adjacent positions in the symbol group, and that N is greater than or equal to $n$, and has no divisors in common with the factors $k_i$ and with the differences between the factors $k_i$ for adjacent positions.

According to the said conditions, N must be an odd number. For if N would be even, all factors $k_i$ should be odd, as otherwise they would have the divisor 2 in common with N. However, in this case the differences between the factors $k_i$ for adjacent positions would all be even, so that they would have the divisor 2 in common with N. Hence, the said conditions cannot be satisfied if N is even.

It will be clear that the greatest liberty in selecting the factors $k_i$, and the greatest certainty in detecting arbitrary transpositions may be obtained by selecting a prime number for N.

In many cases, the same agreements will prevail, or the same apparatus will have to be used for recording or transmitting the check symbol as for composing the symbol groups, so that it is unavoidable to select the check symbols from the given series of $n$ symbols. As N different check symbols are required, N must be be made equal to $n$ in these cases, or equal to $(n+1)$ if $n$ is even. If $N=n+1$, an open space (omission of the check symbol) may be used as an additional check symbol.

For instance, if the symbol groups are composed out of the figures from 0 to 9, and the same figures are also to be used as check symbols, there is no other choice than to make $N=11$. On the other hand, if other symbols, such as the letters of the alphabet, may be used as check symbols, N may also have another value, for instance 13, 17, 19 or 23.

If the symbols of the given series, out of which the symbol groups are composed, also serve as check symbols, it will generally be preferable for practical reasons to make the remainder $R_N(G)$ indicated by a given symbol equal to the number ascribed to the symbol in question. For instance, if the symbol groups are composed out of the 26 letters of the alphabet, which have been numbered according to the rule: $A=0$, $B=1$, $C=2$, etc., the remainder 0 will preferably be indicated by A, the remainder 1 by B, etc. In this case, the remainder 26 will be indicated by an open space (omission of the check symbol). If the symbol groups are composed out of the figures from 0 to 9, which have been numbered according to their numerical value, it will generally be preferable to indicate the remainder 0 by the symbol 0, the remainder 1 by the symbol 1, etc., the open space (omission of the check symbol) serving to indicate the remainder 10.

In the case of symbol groups composed out of the figures from 0 to 9, i. e. of ordinary numbers, it is often suitable to choose the factors $k_i$ in such manner that $$k_i=R_N(10^{i-1}),\text{ or } k_1=1,\ k_2=10,\ k_3=R_N(100)$$

$k_4=R_N(1000)$, etc. By this measure the remainder $R_N(G)$ indicated by the check symbol is made equal to the remainder obtained on dividing the symbol group itself by N, so that the check symbol pertaining to a given number may be found by dividing the number itself by N, and indicating the remainder obtained in this division by the symbol agreed on. If $N=11$, it will be necessary for this purpose to make $$k_1=k_3=k_5=\ \ldots\ =1$$

and $k_2=k_4=k_5=\ \ldots\ =10$, or (which amounts to the same thing):

$$k_1=k_3=k_5=\ \ldots\ =1$$

and $$k_2=k_4=k_6=\ \ldots\ =-1$$

For $N=13$, one finds: $k_1=1$, $k_2=10$, $k_3=9$, $k_4=12$, $k_5=3$, $k_6=4$, $k_7=1$, $k_8=10$, etc.

Of course, in order that the correctness of a symbol group may be checked by means of the device according to the invention, the right check symbol must be known. Hence, the check symbol must be appended to the symbol group as soon as it has been determined for the first time, for instance by inserting the check symbol in the symbol group in a predetermined position, or by combining the check symbols of a sequence of symbol groups into a check group appended to said sequence. If care has been taken in this manner that the check symbol always accompanies the symbol group, the correctness of the symbol group may be checked at any time.

Preferably, the initial determination of the check symbol is performed during or immediately after the formation of the symbol group, so that a check is possible during the whole period of existence of the symbol group.

It is the object of the present invention to provide a simple and inexpensive device for determining a check symbol for any given symbol group, either for appending this check symbol to the group in the first place, or for checking the correctness of a symbol group which is already accompanied by a check symbol.

According to the invention, the device comprises a scale surface, and a selecting surface in parallel with said scale surface and adapted to perform a unidirectional rectilinear or rotatory movement with respect to the scale surface, the selecting surface being provided with a plurality (P) of rows of selecting holes arranged in the direction of movement, and the scale surface being provided with a corresponding number (P) of rows of group symbols arranged in the same direction and each opposite to one of the rows of selecting holes, the said rows of group symbols containing the symbols of the given series in such order that symbols with consecutive numbers are shifted with respect to each other over a different constant number (Q) of positions in each row, the interval (i. e., the linear distance for a rectilinear movement of the selecting surface or the angular distance for a rotatory movement of the selecting surface) between adjacent group symbols and between adjacent selecting holes being constant in each row, equal for all rows and equal for group symbols and selecting holes, so that the symbols of a symbol group may be selected one after another in successive rows of group symbols by engaging the selecting surface with a suitable member at the spot where the symbol in question is displayed, and by displacing the selecting surface until the said member abuts against a fixed stop member.

The numbers Q for successive rows of group symbols may correspond with the factors $k_i$ prevailing for successive positions in the symbol group, and/or they may be equal to the remainders obtained on division by N of the terms of a geometrical progression.

Preferably, the number P is equal to the number of different factors $k_i$ that are used.

In a preferred embodiment of the invention, the selecting surface is partially covered by a covering plate, the said fixed stop member being formed by the edge of this plate.

The total number of selecting holes in each row may be an integral multiple of N.

The selecting surface of the device according to the invention may serve as an indicator at the same time, check symbols arranged on the scale surface being visible through checking holes provided in the selecting surface, so that the appropriate check symbol is displayed by one of the checking holes after selection of a symbol group.

In order that the symbols of a symbol group may be selected from left to right, the rows of selecting holes and/or the rows of group symbols may be shifted with respect to each other in the direction of movement of the selecting surface, in such manner that only one row of group symbols is visible at any time, the fixed stop member for each row of selecting holes being arranged in such a position that the symbols of the next row are made visible after each selection of a symbol in a certain row, and the scale surface contains P rows of check symbols arranged in the direction of movement of the selecting surface, and each containing the check symbols in such order that symbols indicating consecutive values of the remainder $R_N(G)$ are shifted with respect to each other over a different constant number of positions in each row, these numbers being equal in successive rows to the remainders obtained on division by N of successive terms of a geometrical progression with the same ratio of successive terms as the above-mentioned geometrical progression, the distance (for a rectilinear movement of the selecting surface) or the angle (for a rotatory movement of the selecting surface) between adjacent check symbols being constant in each row, equal in all rows, and equal to the corresponding distance or angle for the group symbols and selecting holes, whereas a checking hole or a plurality of checking holes spaced at N positions with respect to each other is provided in the selecting surface opposite to each row of check symbols, these checking holes being arranged in such manner that a check symbol is visible in only one row at any time, and that a check symbol is made visible in the next row after each selection of a symbol.

If the device according to the invention is also to be used for determining the check symbols of symbol groups containing more than P symbols, the said geometrical progressions must be chosen in such manner that the remainder obtained on division by N of the $(P+1)$ the term is equal to the remainder obtained on division by N of the first term, whereas the fixed stop member for each row of selecting holes must be arranged in such manner that the same check symbol returns when the symbol having the number 0 is selected $p$ times in succession. At the same time, the advantage is obtained that the selection of a symbol group may be started in any desired row of selecting holes.

Before proceeding to the selection of a symbol group, the selecting surface must first be brought into a position in which the check symbol indicating the remainder 0 is visible through one of the checking holes. In principle, this may always be done by selecting a predetermined symbol by means of the selecting holes; however, if this symbol is different from the check symbol that has been found, this procedure is rather difficult. Hence, in this latter case, it is preferable to construct the device in such manner that the selecting surface may be returned to its zero position by selecting the check symbol that has been read, by means of the checking hole displaying this check symbol. For this purpose, fixed stop members are provided in the path of the checking holes in such manner that the check symbol indicating the remainder 0 is made visible in the next row upon selection by means of the checking hole of the check symbol that has been found.

The device according to the invention may be provided with a selecting surface formed as a flat circular disc rotatable about its centre. However, this construction entails difficulties in some cases, if the number of positions to be occupied by the selecting surface during selection of a symbol group is large. These difficulties may be avoided by providing a selecting surface formed as a cylindrical drum or as an endless belt. Furthermore, the selection of a symbol group by means of a pin or finger inserted in the selecting holes may be difficult in these cases, so that it may be preferable to use a special member for this purpose, this member being movable in both directions in the same manner as the selecting surface and coupled with the selecting surface by means of a coupling operative in one direction only. For instance, the selecting surface may be provided with a row of teeth at its circumference, engaging a pawl attached to the selecting surface. In this case, a return movement of the selecting surface may be prevented in a simple manner by locking means likewise engaging the said row of teeth.

The invention will now be more fully explained with reference to the accompanying drawings in which some embodiments of the invention are shown.

Figure 1:
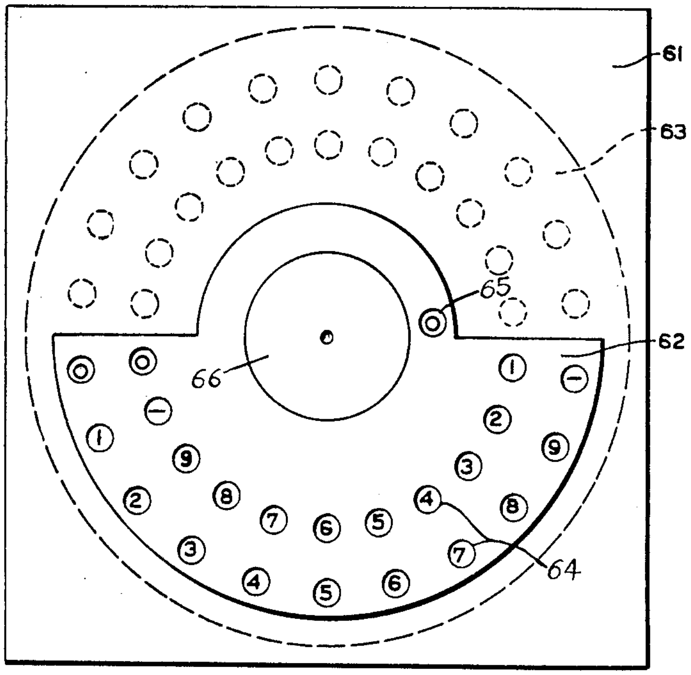
Fig. 1 is a front view of a device for determining the check symbols of symbol groups composed out of the figures from 0 to 9, wherein the number N is equal to 11.
Figure 2:
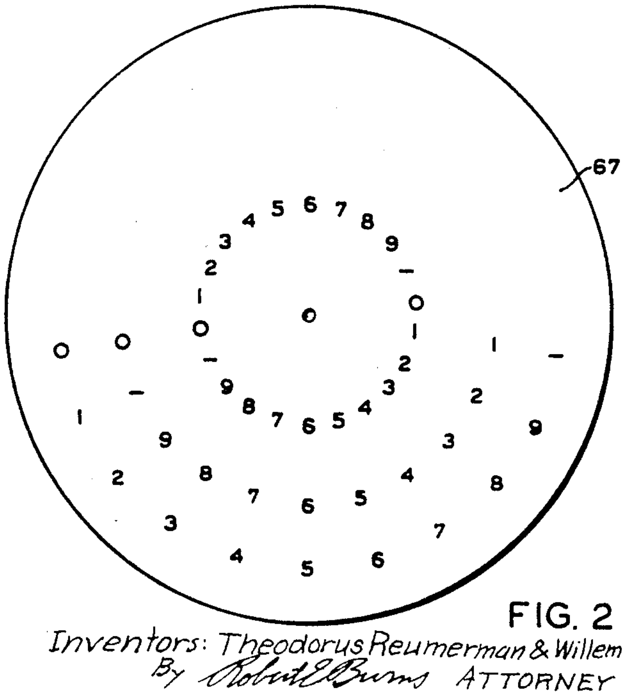
Fig. 2 is a front view of the same device after removal of the dial.

In the device shown in Figs. 1 and 2, the factor $k_i$ is equal to 1 for all odd positions, and to $-1$ for all even positions. The device comprises a casing 61, made of cardboard, for instance, and provided with an aperture 62, having the shape of two juxtaposed semicircles with different radii, in the front wall. A dial 63, rotatably supported in the casing 61, and partially visible through the aperture 62, is provided with a plurality of holes 64, arranged in two concentric circles. Each row contains 22 holes forming a closed circle, 11 of these holes being visible through the aperture 62 at any time. Moreover, the dial 63 has a hole 65 nearer to the centre of the dial than the holes 64, and continuously visible through the aperture 62. An operating member 66 is attached to the dial in order that the same may readily be returned to its zero position.

A scale 67 is arranged against the rear wall of the casing 61 and behind the dial 63, so as to be visible through the holes 64 and 65. This scale comprises two rows of symbols arranged in concentric circles, the outermost row containing the figures from 0 to 9 in their natural order, followed by a —, whereas the innermost row contains the figures from 1 to 9 in the opposite order, followed by a — and by the figure 0. The figures 0 in both rows are opposite to each other, and the rows are each opposite to one of the rows of holes 64, in such manner that a symbol is visible through each of the holes 64. In addition, the scale comprises a row of 22 symbols arranged in a closed circle nearer to the centre of the scale, and visible through the hole 65. This last-mentioned row contains twice the figures from 0 to 9 in their natural order and an open space marked by a — after each 9. In order to determine the check symbol of a given number with the aid of the above-described device, the dial is first brought into its zero position by means of the operating member 66, so that a nought appears in the hole 65. Thereupon, the first figure from the right of the given number is selected by inserting a pin in the hole 64 of the outermost row through which this figure is visible, and rotating the dial in a clockwise direction until the pin abuts against the edge of the aperture 62. The second figure, counting from right to left, is then selected by inserting the pin into hole 64 of the innermost row through which the figure in question is visible, and again turning the dial in clockwise direction until the pin abuts against the edge of the aperture 62. The dial is now rotated in clockwise direction over a number of steps equal to 11 less the numerical value of the selected figure. Thereupon, the third figure is selected in the same manner in the outermost row, the fourth figure in the innermost row, and so on. Thus, in selecting a symbol group to be checked, the dial is displaced over $t$ steps, wherein $$t=a_1+11-a_2+a_3+11-a_4+a_5+\ . \ . \ .$$

Hence, it will be clear that $R_{11}(t)=R_{11}(G)$, so that the right check symbol will be visible through the hole 65 after selection of the symbol group.

Figure 3:
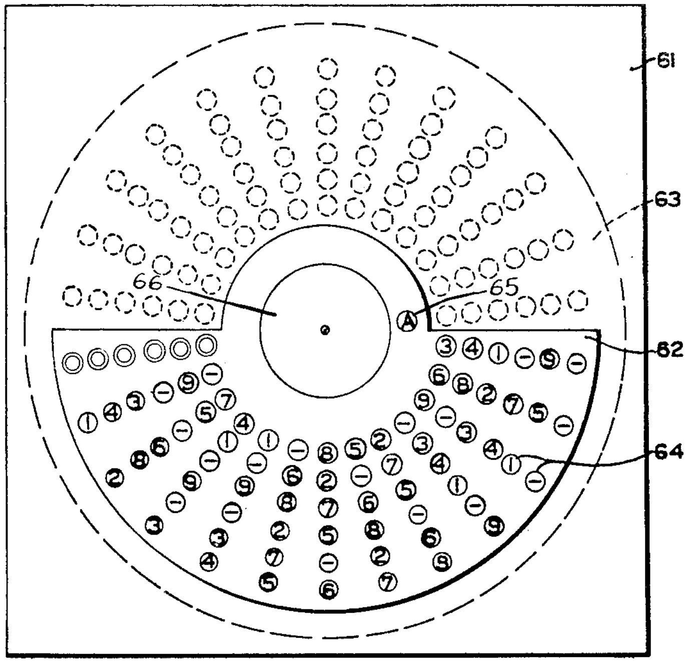
Figs. 3 and 4 show in the same manner a similar device, for which the number N is equal to 13.
Figure 4:
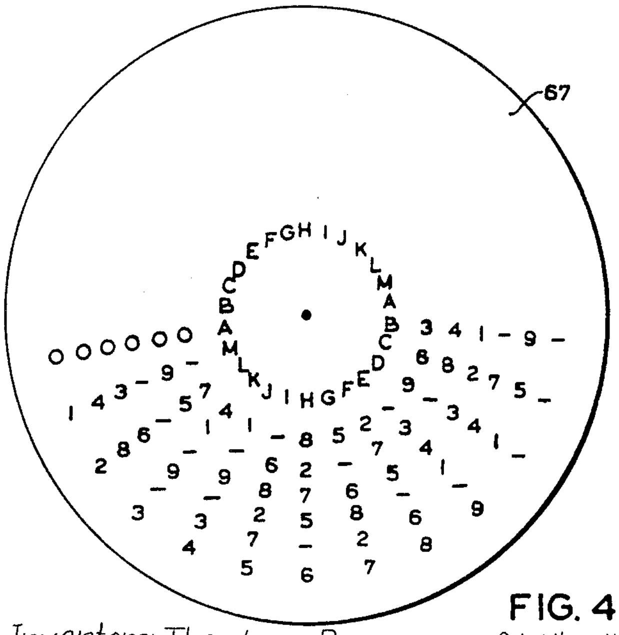

In the device shown in Figs. 3 and 4, $k_i$ is equal to $R_N(10^{i-1})$, or: $k_1=1$, $k_2=10$, $k_3=9$, $k_4=12$, $k_5=3$, $k_6=4$, $k_7=1$, etc. The device is substantially similar to the device shown in Figs. 1 and 2. However, since six different factors $k_i$ are used, the dial 63 comprises six rows of holes 64, each consisting of 26 holes, 13 of which are visible through the aperture 62 at any time. The scale 67 is likewise provided with six rows of symbols visible through the holes 64, and arranged in concentric semicircles in such manner that a position $p$ in the $i$th row from the outside is always occupied by a symbol having the number $(p+13b)/k_i$. The positions $p$ are assumed to be numbered from left to right with the numbers from 0 to 12. In the outermost row, the position $p$ is always occupied by the figure $p$. The fourth position of the second row is occupied by the figure $(4+26)/10=3$, for instance, and the eighth position of the fifth row by the figure $(8+13)/3=7$. If a certain position ought to be occupied by a symbol having the number 10, 11 or 12 according to the above-mentioned rule, such a position has been left open. Upon selecting the symbol $A_i$ having the number $a_i$ by inserting a pin into the hole 64 of the $i$th row through which the symbol $A_i$ is visible, and rotating the dial until the pin abuts against the edge of the aperture 62, the dial 63 is displaced over $(k_ia_i-bN)$ steps.

The scale 67 also comprises a row of 26 check symbols arranged in a closed circle, one of these symbols being visible through the hole 65 at any time. The said row contains twice the letters from A to M. In principle, it is immaterial which of the letters will be used to indicate the remainder 0. If the letter M is chosen for this purpose, for instance, the dial will have to be brought in such a position as to make the letter M visible through the hole 65 before determining a check symbol.

In order to determine the check symbol of a given number by means of the device shown in Figs. 3 and 4, the first figure from the right is selected in the outermost row of holes 64, the second figure in the second row from the outside, and so on. If necessary, the seventh figure is again selected in the first row. It will be clear that the dial 63 is displaced over a number of steps corresponding to the check number G but for a multiple of N, so that the right check symbol will appear in the hole 65 after selection of the number to be checked.

It is to be noted that in the devices shown in Figs. 1–4 the check symbol also indicates the remainder obtained on dividing the number to be checked itself by N, i. e. by 11, or 13 respectively. Hence, these devices may be used for checking the correctness of arithmetical calculations. For instance, if the correctness of a multiplication is to be checked by means of the device shown in Figs. 1 and 2, the check symbols of the multiplier and the multiplicand are determined, and these symbols are multiplied by each other. The product obtained in this manner is divided by 11, and the remainder yielded by this division must be equal to the check symbol of the product of the multiplication to be checked. Additions, subtractions, divisions, and extractions of roots may be checked in a similar manner.

Figs. 5–8 relate to modifications of the devices shown in Figs. 1–4. The devices shown in these last-mentioned figures present the disadvantage that the first symbol from the right of a symbol group to be checked must always be selected in a predetermined row of symbols. In order to satisfy this condition, it is necessary in practice to select the symbols of the group from right to left, which involves certain difficulties, as the symbol groups are always read from left to right.

In the devices shown in Figs. 5–8, this disadvantage has been avoided, and the symbols of a symbol group to be checked may be selected from left to right.

Figures 5, 6:
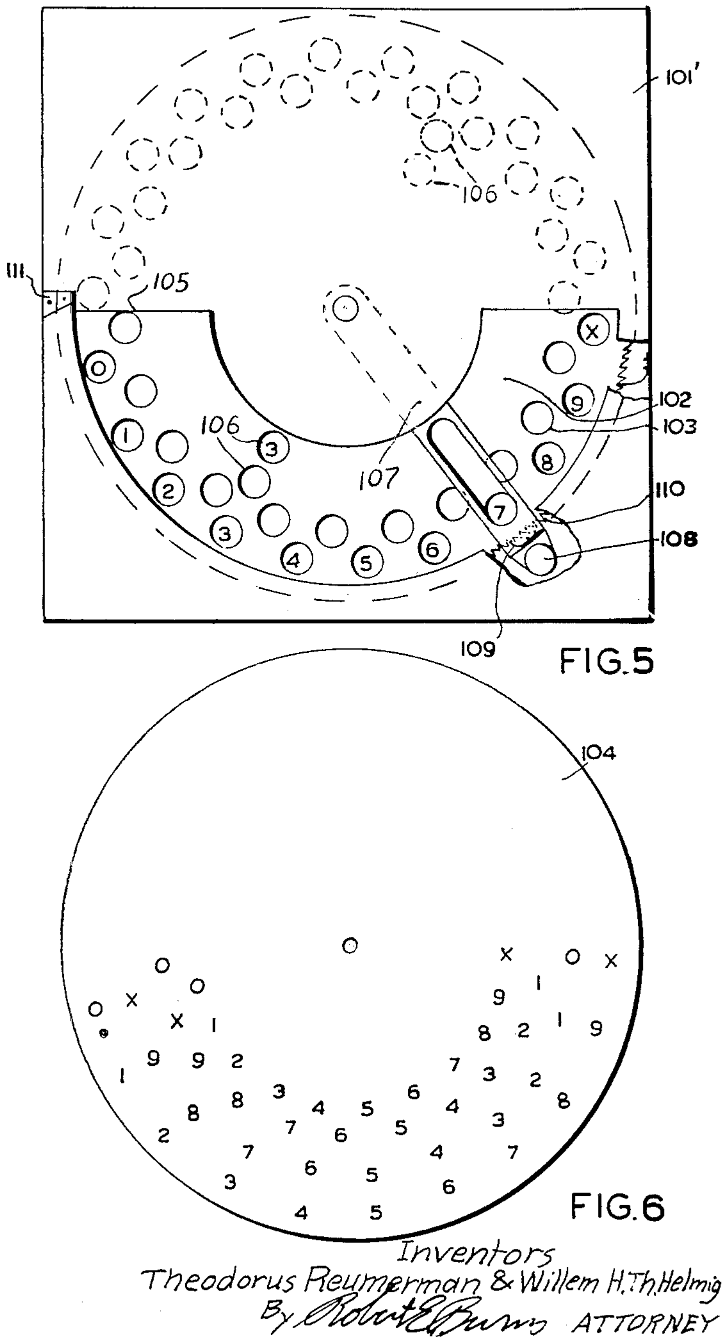
Fig. 5 is a front view of a modification of the device shown in Figs. 1 and 2, by means of which the symbols of a symbol group to be checked may be selected from left to right, and in which the number N is equal to 11.
Fig. 6 shows the scale surface of this device.

The device shown in Fig. 5 comprises a casing 101′ formed as a flat box, and provided at its top with an annular aperture extending through 180°, through which a dial 102, rotatably mounted in the casing, is visible. This dial is provided with two concentric rows of selecting holes 103, through which the scale surface 104, arranged underneath the dial on the bottom of the casing, is visible. This scale surface, which is separately shown in Fig. 6, comprises four concentric rows of symbols. The two outermost rows contain the symbols serving for selection of a symbol group and designated as group symbols hereinafter, whereas the two innermost rows contain the check symbols. The angle between two adjacent symbols is constant in each row and equal in the four rows, and is at the same time equal to the angle between two adjacent selecting holes. This angle will be designated as the pitch hereinafter. The dial 102 can only be rotated clockwise. At the left, the edge 105 of the annular aperture constitutes a stop for the member by means of which the dial 102 is rotated.

The two rows of selecting holes 103 provided in the dial 102 are shifted with respect to each other in a tangential direction over half the pitch, so that only one row of group symbols is visible through the appertaining selecting holes at any time. The distance between the edge 105 and the front edge of the selecting hole displaying the first symbol of the visible row of group symbols is equal to half the pitch. Thus, after selection of a symbol in one of the two rows of group symbols, the other row of group symbols is made visible through the appertaining selecting holes.

The check symbols arranged at the inner side of the scale surface are visible through checking holes 106 provided in the dial; there are two pairs of checking holes diametrically opposed to each other. One of these pairs is located underneath the covering plate of the casing 101′ at any time, whereas the check symbol appertaining to the selected symbol group is visible through one of the holes of the other pair. The two rows of check symbols are shifted with respect to each other in a tangential direction over half the pitch, so that a symbol may be read in only one of the rows at any time. After selection of a symbol in the visible row of group symbols, a check symbol is made visible in the other row of check symbols.

As appears from Fig. 6, the outermost row of group symbols contains the symbols of the given series in the order in which they are numbered; in the embodiment represented in the drawing, these are the figures from 0 to 9, numbered according to their numerical value, and followed by the symbol X designating the number 10. The innermost row of group symbols contains the same symbols in opposite order. The outermost row of check symbols contains the figure 0, the symbol X, and the figures from 9 to 1, successively, whereas the innermost row of check symbols contains the figures from 0 to 9, followed by the symbol X.

It is easy to convince oneself that the dial 102 makes $(a_i+\frac{1}{2})$ steps upon selection of a symbol $A_i$ having the number $a_i$ in the outermost row of selecting holes, and $(10\frac{1}{2}-a_j)$ upon selection of a symbol $A_j$ having the number $a_j$ in the innermost row of selecting holes. Upon selection of a symbol group $\overline{A_qA_{q-1} \ldots A_2A_1}$, the symbols being selected from left to right, beginning in the outermost row, the dial will be removed from its zero position, or from the diametric position, respectively, after selection of the group over a number of steps $t$, which is found to be: $t=R_{11}(a_q-a_{q-1}+ \ldots +a_2-a_1)$, if $q$ is even, and $t=R_{11}(a_q-a_{q-1}+ \ldots -a_2+a_1+\frac{1}{2})$, if $q$ is odd. In the first case, the check symbol is read in the innermost row, in which the number of this symbol is equal to $(11-t)$; in the second case the check symbol is read in the outermost row, in which the number of this symbol is equal to $(t-\frac{1}{2})$. Hence, the number of the check symbol which is found, is always equal to $R_{11}(a_1-a_2+a_3-a_4+ \ldots )$, i. e. it corresponds with the remainder obtained on division by 11 of the algebraic sum of the numbers of the symbols of the group, each multiplied by a factor $k_i$, which is equal to 1 for all odd positions (counting from right to left), and to $-1$ for all even positions. The same result is obtained if the selection of the symbol group is started in the innermost row of group symbols.

The dial 102 may always be returned to its zero position by selecting the check symbol which has been read with the aid of the selecting holes 103; for this reason, the symbol X indicating the remainder 10 has been included in the rows of group symbols.

The selection of a symbol group to be checked may be performed by means of the above-described device in the usual manner by inserting a finger in the selecting hole through which the symbol to be selected is visible, and by rotating the dial by means of this finger until the same abuts against the edge 105. However, in the embodiment shown in the drawing, a special selecting member 107 has been provided for facilitating the selecting procedure. This selecting member consists of a flat lever rotatable around the same axis as the dial, and provided with an oblong aperture through which the selecting holes 103 are visible, and with an operating member 108. A pawl 109 attached to the selecting member 107 engages a row of teeth 110 arranged at the circumference of the dial. The selection is made by turning back the selecting member 107 until the symbol to be selected is visible through the oblong aperture, and by moving it forward after that until the operating member abuts against a stop 111 placed in alignment with the edge 105; during the forward movement of the selecting member, the dial 102 is taken along. A return movement of the dial is prevented by locking means engaging the row of teeth 110.

Figures 7, 8:
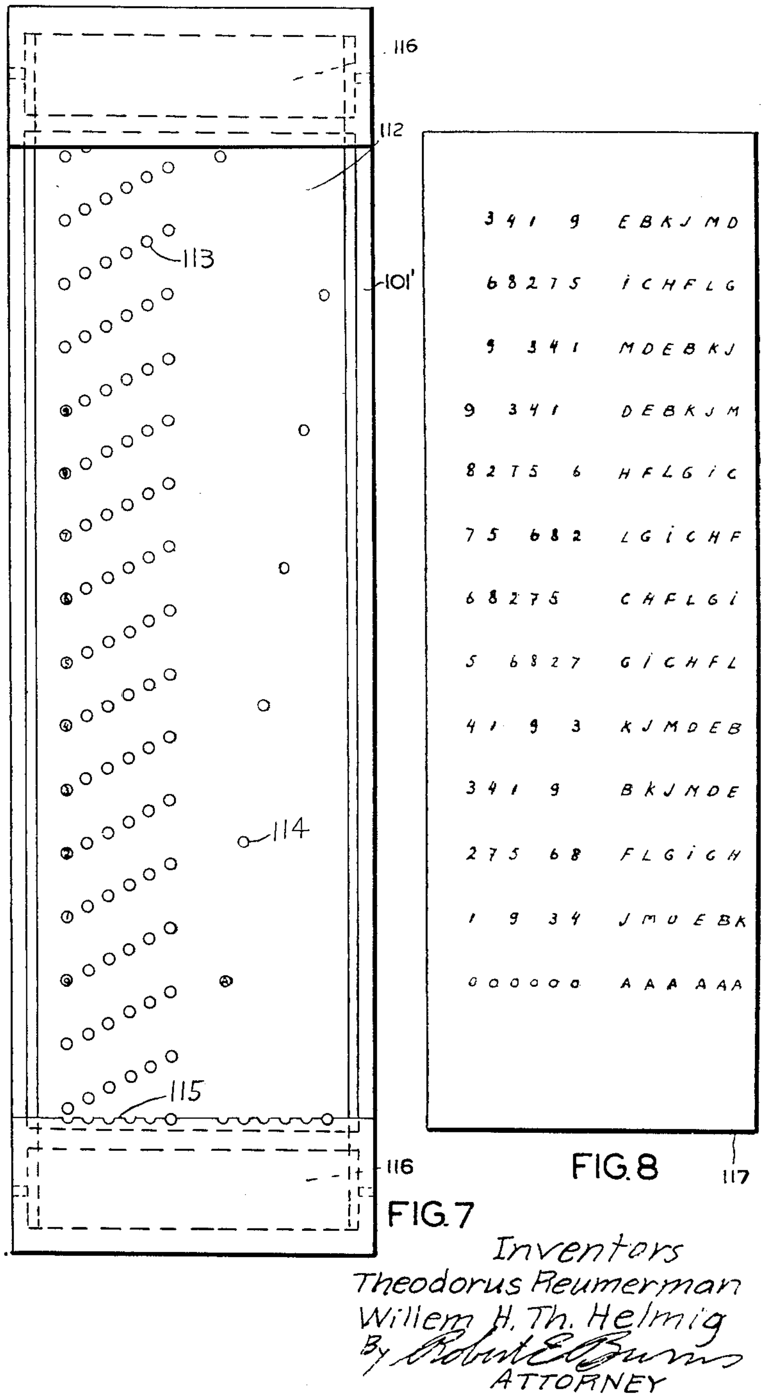
Fig. 7 is a front view of a modification of the device shown in Fig. 5, wherein an endless belt serves as a selecting surface, and wherein the number N is equal to 13.
Fig. 8 shows the scale surface of the device shown in Fig. 7.

Figs. 7 and 8 show an embodiment in which the number N is equal to 13. The selecting surface of this device is formed as an endless belt 112, provided with six rows of selecting holes 113, spaced at the same constant distance (the pitch) with respect to each other in each row. Each row has been shifted with respect to the preceding one in the direction of movement of the belt 112 over one sixth of the pitch. Furthermore, the belt is provided with six rows of checking holes 114, the distance between two holes of one and the same row being equal to thirteen times the pitch, and the rows being shifted with respect to each other over a distance equal to 13/6 times the pitch. The selection of a symbol is made by inserting a pin in the selecting hole 113 through which the symbol to be selected is visible, and by moving the belt by means of the pin until the same abuts against the edge 115. The belt 112 may be returned to its zero position at any time by inserting the pin in the checking hole displaying the check symbol, and by moving the belt until the pin abuts against the edge 115. For this purpose, the edge 115 extends through the path of the checking holes. The belt 112 is carried by rollers 116 at both ends of the casing 101'.

The scale surface 117 separately shown in Fig. 8 is provided at the left with six rows of group symbols visible through the selecting holes 113. The group symbols consist of the figures from 0 to 9 numbered in their natural order. The distance between two symbols with consecutive numbers, for instance, between the figures 0 and 1, is equal to one position in the first row, to 4 positions in the second row, to three positions in the third row, to 12 positions in the fourth row, to 9 positions in the fifth row, and to 10 positions in the sixth row. The said numbers 1, 4, 3, 12, 9, 10 are the remainders obtained on division by 13 of the terms of the geometrical progression 1, 4, 16, 64, 256, 1024, in which the ratio of successive terms is equal to 4; the remainder obtained on dividing the seventh term of this series by 13 is again equal to 1. As the rows of selecting holes 113 are shifted with respect to each other, only one row of group symbols is visible through the appertaining selecting holes at any time. The distance from the selecting hole displaying the first figure (0) of the row to the edge 115 is equal to 13/6 times the pitch. Thus, the next row of group symbols is made visible after each selection of a symbol. If the figure 0 is selected six times in succession, the belt 112 is displaced over 13 positions, so that it returns to the zero position.

At the right, the scale surface 117 is provided with six rows of check symbols visible through the checking holes 114. The letters from A to M serve as check symbols, a remainder 0 being indicated by the letter A, a remainder 1 by the letter B, and so on. The distance between two letters indicating consecutive values of the remainder, for instance, between the letters A and B, is equal to 3 positions in the first row, to 12 positions in the second row, to 9 positions in the third row, to 10 positions in the fourth row, to one position in the fifth row, and to 4 positions in the sixth row. The said numbers 3, 12, 9, 10, 1 and 4 are the remainders obtained on division by 13 of the terms of the geometrical progression 3, 12, 48, 192, 768, 3072, wherein the ratio of successive terms is equal to 4; the remainder obtained on division by 13 of the seventh term of this series is again equal to 3. As the rows of check symbols are shifted with respect to each other over 13/6 times the pitch, a check symbol is visible through the appertaining checking hole 114 in only one row at any time; after selection of a group symbol, a check symbol is made visible in the next row. The distance from the edge 115 to the first check symbol (A) is equal to the distance over which the rows of check symbols are shifted with respect to each other (13/6 times the pitch), so that the symbol A is visible in any row when the checking hole of the preceding row is placed against the edge 115; hence, the belt 112 may always be returned to its zero position by selecting the displayed check symbol in the usual manner by means of the appertaining checking hole.

It is easy to convince oneself that the belt 112 is displaced upon selection of a symbol $A_i$ having the number $a_i$ over a number of steps equal to $R_{13}(13/6+a_i)$ if the symbol is selected is the first row, to $R_{13}(13/6+4a_i)$ if the symbol is selected in the second row, and so on. Hence, if the symbol is selected in row $j$, the belt 112 is displaced over $R_{13}(13/6+4^j.a_i)$ steps.

If the belt 112 has been displaced over $t$ positions from the zero position represented in the drawing, the number $a_c$ of the check symbol is equal to $R_{13}(t-13/6)$ if the check symbol is read in the second row, to $$R_{13}[10(t-2.13/6)]$$

if the check symbol is read in the third row, and so on. Hence, if the check symbol is read in row $(j+1)$, its number is equal to $R_{13}[10^j(t-j.13/6)]$.

Upon selection of the symbol group $$\overline{A_qA_{q-1} \ldots A_2A_1}$$

the symbols being selected from left to right, beginning in the first row from the left, the number of steps $t$ made by the belt 112 is found to be:

$$t=R_{13}(q.13/6+a_q+4a_{q-1}+ \ldots +4^{q-1}a_2+4^q a_1)$$

The check symbol is read in row $(q+1)$, so that its number is equal to:

$$a_c=R_{13}[10^q(t-q.13/6)]=R_{13}(40^q a_1+10.40^{q-1}a_2+10^2.40^{q-2}a_3+ \ldots )$$

Since $R_{13}(40)$ is equal to 1, the number of the check symbol is found to be: $a_c=R_{13}(a_1+10a_2+10^2a_3+ \ldots )$, i. e. the number of the check symbol corresponds with the remainder obtained on division by 13 of the sum of the numbers of the symbols of the group, each multiplied with a factor $k_i$ which is equal to $R_{13}(10^j)$ for the $j$th position from the right in the symbol group.

The same result is obtained when the selection is started in any other row of group symbols, provided that the belt 112 has first been brought in such a position that the check symbol A is displayed.

Instead of shifting the rows of selecting and checking holes with respect to each other, it is also possible to shift the rows of group and check symbols with respect to each other; however, the stops limiting the movement of the selecting surface will have to be arranged at different positions for each row in that case.

In the device shown in Figs. 7 and 8, the selecting surface is formed as an endless belt in order to obtain a surveyable arrangement of the numerous group and check symbols. Instead thereof, the selecting surface might be formed as a cylindrical drum for this purpose.

In the appended claims, the term "symbol group" designates a group consisting of any desired number of symbols selected from a given series of $n$ symbols, and the symbols in said given series are assumed to be numbered in a predetermined order. The term "check symbol of a symbol group" designates a symbol giving a univocal indication of the remainder $R_N(G)$ obtained on division of a number G by a whole number N, the said number G being equal to the algebraic sum of the numbers of the symbols of the group each multiplied by a whole factor $k_i$ dependent on the position of the symbol in the group and different for adjacent positions, and the said number N being equal to or greater than $n$ and having no divisors in common with any of the factors $k_i$ and with any of the differences between the factors $k_i$ for adjacent positions.

We claim:

1. A device for determining a check symbol for a symbol group consisting of symbols taken from a given series, comprising a scale member bearing a plurality of parallel rows of group symbols each containing in a different order the symbols of said given series, a selector in parallel with said scale member, provided with a plurality of parallel rows of selecting holes each opposite to one of the said rows of group symbols, and movable with respect to said scale member in the direction of the said rows, and at least one fixed stop member in the path of the said selecting holes, the distances between adjacent group symbols and between adjacent selecting holes in the various rows being such that a movement of the selector causes corresponding selecting holes in each row to pass across an equal number of group symbols.

2. A device as claimed in claim 1, further comprising a covering plate attached to said scale member and partly covering said selector, wherein an edge of said covering plate constitutes the said stop member.

3. A device as claimed in claim 1, wherein said scale member further bears a plurality of check symbols, and wherein said selector is further provided with at least one checking hole displaying the said check symbols.

4. A device for determining a check symbol for a symbol group consisting of symbols taken from a given series, comprising a scale member bearing a plurality of parallel rows of group symbols each containing in a different order the symbols of said given series, and a plurality of parallel rows of check symbols each containing in a different order the symbols of a second series, the number of rows of group symbols being equal to the number of rows of check symbols, a selector in parallel with said scale member, provided with a plurality of parallel rows of selecting holes each arranged opposite to one of the said rows of group symbols in such manner that only one row of group symbols is visible at any time, and with at least one checking hole opposite to each of the said rows of check symbols, arranged in such manner that a check symbol is visible in only one row at any time, and movable with respect to said scale member in the direction of the said rows, and at least one fixed stop member arranged in the path of the said selecting holes in such manner that the next row of group symbols and a check symbol in the next row are made visible after selection of a symbol, the distances between adjacent group symbols, between adjacent check symbols, and between adjacent selecting holes in the various rows being such that a movement of the selector causes corresponding selecting holes in each row to pass across an equal number of group symbols, and the checking holes to pass across the same number of check symbols.

5. A device as claimed in claim 4, wherein the said rows of group symbols, the said rows of check symbols, and the said rows of selecting holes have a circular shape, and wherein said selector is rotatable with respect to said scale member, the angle between adjacent group symbols, between adjacent check symbols, and between adjacent selecting holes being constant in each row and equal in all rows.

6. A device as claimed in claim 4, wherein the said rows of group symbols, the said rows of check symbols, and the said rows of selecting holes have a rectilinear shape, and wherein said selector is movable in a rectilinear fashion with respect to said scale member, the distance between adjacent group symbols, between adjacent check symbols, and between adjacent selecting holes being constant in each row and equal in all rows.

7. A device as claimed in claim 6, wherein said selector is formed as an endless belt.

8. A device as claimed in claim 4, further comprising a selecting member movable in both directions with respect to said scale member in the same manner as said selector, and coupling means operative in one direction only for coupling said selecting member with said selector.

9. A device as claimed in claim 8, further comprising a row of teeth at the circumference of said selector, and a pawl attached to said selecting member and engaging the said row of teeth.

10. A device as claimed in claim 9, further comprising locking means engaging the said row of teeth and preventing a return movement of said selector.

11. A device as claimed in claim 4, further comprising at least one fixed stop member in the path of said checking holes, arranged in such manner that a predetermined zero check symbol is made visible after selection of the displayed check symbol by means of the said checking holes.

12. A device for determining a check symbol for a symbol group consisting of symbols taken from a given series, comprising a scale member bearing a plurality of parallel rows of group symbols each containing in a different order the symbols of said given series, a selector in parallel with said scale member, provided with a plurality of parallel rows of selecting holes each opposite to one of the said rows of group symbols, and movable with respect to said scale member in the direction of the said rows, and at least one fixed stop member in the path of the said selecting holes, the interval between adjacent group symbols and between adjacent selecting holes being constant in each row, equal for all rows, and equal for group symbols and selecting holes.

References Cited in the file of this patent

UNITED STATES PATENTS 2,324,957 Shaw ---------------- July 20, 1943